United States Patent
Day

(10) Patent No.: US 6,577,458 B2
(45) Date of Patent: Jun. 10, 2003

(54) MEMO TAPE RECORDER AND READER SYSTEM AND METHOD

(76) Inventor: Richard Paul Day, 1587 Oxford St., #16, Redwood City, CA (US) 94061-2878

(*) Notice: Subject to any disclaimer, the term of this patent is extended or adjusted under 35 U.S.C. 154(b) by 0 days.

(21) Appl. No.: 10/125,962

(22) Filed: Apr. 18, 2002

(65) Prior Publication Data

US 2002/0154429 A1 Oct. 24, 2002

Related U.S. Application Data

(60) Provisional application No. 60/285,070, filed on Apr. 20, 2001.

(51) Int. Cl.[7] ................................................. G11B 5/00
(52) U.S. Cl. ........................................ 360/1; 360/117
(58) Field of Search .......................... 360/1, 2, 94, 117, 360/137; 347/2; 358/502

(56) References Cited

U.S. PATENT DOCUMENTS

| | | | |
|---|---|---|---|
| 3,521,007 A | 7/1970 | Laghaie et al. | 179/100.2 |
| 3,610,635 A | 10/1971 | Schiff et al. | 274/4 J |
| 4,044,393 A | 8/1977 | Budrose | 360/117 |
| 4,139,875 A | 2/1979 | Tatara et al. | 360/94 |
| 4,337,375 A | 6/1982 | Freeman | 179/1 SA |
| 4,541,028 A | 9/1985 | Johnson | 360/137 |
| 5,349,480 A * | 9/1994 | Takao | 360/74.1 |
| 5,634,728 A * | 6/1997 | Nunokawa et al. | 400/54 |
| 5,839,108 A * | 11/1998 | Daberko et al. | 704/270 |
| 6,102,505 A * | 8/2000 | McIntyre et al. | 347/2 |
| 6,216,104 B1 | 4/2001 | Moshfeghi et al. | 704/260 |
| 6,510,208 B1 * | 1/2003 | Komiya | 379/88.1 |

FOREIGN PATENT DOCUMENTS

WO     WO99/00701     1/1999

* cited by examiner

*Primary Examiner*—Regina N. Holder
(74) *Attorney, Agent, or Firm*—LaRiviere, Grubman & Payne, LLP

(57) ABSTRACT

There is provided a system and method for the recordation an audio message, whereby the system converts the recorded message to a digital format, and stores the message on a record medium (18) integrally associated with the system. The record medium (18) with recorded message can be removably affixed to a wide range of objects. The system easily facilitates read, decode, and playback functionality for the recorded message without necessitating removal of the record medium (18) from the object to which it is affixed. Further, the system provides the functionality to store and forward audio messages in digital format to various computer systems (56) and computer-related devices.

17 Claims, 4 Drawing Sheets

MEMO TAPE RECORDER AND READER SYSTEM AND METHOD

RELATED APPLICATION

This application claims priority from U.S. Provisional Patent Application Ser. No. 60/285,070, filing date Apr. 20, 2001, the entire content of which is incorporated herein by reference.

TECHNICAL FIELD

The present invention pertains generally to an audio recorder and play device and method. More particularly, this invention pertains to an innovative device and method providing the functionality for recording an audio message, providing a mobile medium of recorded data for placement on various objects, and reading and playback of the audio message from the mobile medium.

BACKGROUND ART

Currently, recording systems for capturing audio data are well known in the art. These systems include audio recorders and various components for data capture. For example, the U.S. Pat. No. 3,610,635 to Schiff, et al. discloses a card adapter attachment for a cassette tape recorder, wherein the attachment fits into a tape storage space of the recorder and provides a channel for guiding a magnetic card past the playback transducer. Similarly, the U.S. Pat. No. 4,139,875 to Tataram, et al. discloses a cassette and card recording and/or reproducing apparatus for recording and/or reproducing signals on a magnetic recording medium in the form of a tape contained in a cassette and being movable in a run along a side of the cassette, or in the form of a card having a magnetic stripe or band affixed thereto parallel to an edge portion of the card. Such art, however, fails to provide its own record medium having the recorded audio message where the medium can be mechanically associated with an object independent of said recording apparatus or card and still cooperate with a reading and playback device for producing the recorded audio message. Thus the user of such a device must first procure suitable media, such as cassette tape, for use with a recording device, record an audio message with the recorder and transmit to the medium, then remove and store the medium. Typically, storage potential does not include an option for storage with an object associated with the message; e.g., client files having paper documentation related to the audio message or an option to store the medium at a locale conducive to playback, when required. Thus, the user must expend unnecessary effort remembering the location of the medium and retrieving the medium before the recorded message can be heard. Additionally, the playback apparatus for playing the recorded message may not facilitate mobile playback operations. This results in cumbersome manual operations such as positioning the playback device, loading the cassette tape having the message in a playback device or swiping a card having a magnetic stripe with the message encoded thereon through a playback device with a card reader component.

Other devices in this field include the invention disclosed in U.S. Pat. No. 4,044,393 to Budrose for reading pre-recorded audio from magnetic media. While this provides for playback of an audio message, this device does not facilitate conversion of the audio data to digital data, or the ability to read and replay an audio message stored in digital format. The device does not permit the user to record messages for storage with an associated object. Another handheld device is disclosed in the U.S. Pat. No. 3,521,007 to Laghaie for recording and reproducing electromagnetic impulses printed on paper and printed book. The device does not provide a record medium geared to placement on an associated object. Significantly, none of the previously mentioned devices provides the functionality necessary to record an audio message in real time, convert the audio to digital data, and transmit the data to a computer system or other device for further use.

Yet other devices for audio capture and replay include U.S. Pat. No. 4,337,375 to Freeman that discloses a data reading apparatus for manually and selectively controlling input data to a speech synthesizer at an incremental level having the facility to input data at a rate of speed approximating the normal speech rate. Similarly, U.S. Pat. No. 6,216,104 to Moshfeghi et al. discloses user equipment devices that are configured for speech synthesis in which audible messages are generated. Such devices are useful for text-to-speech synthesis, but do not provide for capture and generation of audio messages generated by humans. Further, play of a synthesized message does not aptly convey the prosody of the human voice to the listener, an important attribute for determining meaning and content based on verbal intonation, rhythm, speaker identification and so forth.

The current art also provides a device for playing and/or recording upon insertable magnetic record sheets which can be affixed to the reverse side of a photograph, as disclosed in U.S. Pat. No. 4,541,058 to Johnson. The message associated with the record sheet can be played by insertion of the sheet into the device. This invention, however, fails to provide digital functionality. Further, it fails to provide for an adaptable medium integrally coexisting with the recording device where, after recordation of a message, the medium can easily be affixed to objects of various sizes and constructs. Finally, the device is constrained in its design to playback of messages on unattached sheets or to sheet attached to a narrow range of objects such as a greeting card or a photograph. Thus, a user of the device cannot, for example, record or playback an audio message for affixation to an antique vase or other large, three-dimensional objects of unique or substantial mass or surface area.

What is needed, therefore, is a system for ready recordation in real time of an audio message, whereby the system captures with absolute accuracy the audio and emotional modulation of the original message, converts the recorded message to a digital format, and stores the message on a record medium integrally associated with the system. The system should further provide the record medium with recorded message to the user such that the user can removably affix the record medium to a wide range of objects. The system should easily facilitate read, decode, and playback functionality for the recorded message without necessitating removal of the record medium from the object to which it is affixed. Further, it is desirable for such a device and medium to promote playback of an audio message in a format that retains the modulation qualities and characteristics of the original audio message. Such a system should be compact and mobile for ease of use, with accommodations for multiple power sources. Finally, such a system should possess the capability to store and forward audio messages in digital format, for use with computer systems and computer-related devices.

DISCLOSURE OF THE INVENTION

The present invention addresses the deficiencies found in the prior art with just such a system and method, and provides a comprehensive solution for recordation and playback of audio messages. The system and method incorporate the means necessary to generate a record medium capable of removable affixation to any type of object. Once affixed to the object, the record medium can be scanned for playback of the audio message in true quality form, without removal of the record medium from the object. In certain embodiments, a scanned message can be stored and forwarded in digital format to a computer system or the like for capture of data associated with the message; e.g., a digital diary of companies, clients or objects, etc.

In one embodiment, the system includes a base unit, a record medium on which the base unit records an audio message; and an independent or integrated handheld unit for playback of the recorded message from the record medium. The base unit generally comprises a housing, a microphone for capture of the audio message in real time, true form and a first speaker to facilitate an audio test prior to recordation on the record medium; e.g., playback of the captured message prior to generation of the record medium. Certain embodiments include a converter for conversion of the audio analog data to/from digital data. Various embodiments include an encoder for capture of a timing sequence associated with the rate of speech originally recorded. The base unit records the captured audio onto a record medium in various formats for storage; e.g., digital format.

The record medium anticipates various forms and constructs, including magnetic tape, tape accommodating digital data, and a system by where the record medium comprises a microchip associated with the tape. The record medium is further associated with means for affixation to an object associated with the audio message, wherein the record medium can be removably attached to the object. The means for affixation include adhesive formulations disposed on the record medium or an associated substrate and other means necessary to carry out the function described herein. Various embodiments provide tape such as "sticky tape", or other known media having after use characteristics, whereby the record medium may be selectively affixed to an object, removed and reattached to another object.

The handheld unit includes a member having a data pickup head for scanning and collecting the time-coded data, a deconverter for conversion of the digital data to/from analog format, a memory device for temporary or permanent storage of the scanned message, a data sender, a decoder for processing of the time sequence code and a second speaker for playback of the recorded message from the record medium attached to the selected object. Various embodiments include volume control features, clip-on holsters and other accessories for ease of use.

A method of the present invention includes the steps of recording an audio message via a base unit having a microphone, a first speaker, a record mechanism and a converter onto a record medium having means for affixation, the record medium associated with the base unit; dispensing from the record unit the record medium having the recorded message; scanning the recorded message on the record medium with a handheld unit having a data pickup head, a memory device, data sender, a deconverter and a second speaker; and playing the scanned message with the handheld unit. Alternative methods also include any combination of any or all of the steps of storing the scanned message in a memory device associated with the handheld unit, transmitting the stored message to another device via a data sender, encoding a time sequence code, and decoding a time sequence code.

It is a general object of the present invention to provide a recording, documentation and playback device and method for use in real time or after the fact.

Another object of the present invention is to provide an absolutely accurate recollection of an audio message in true quality format.

Yet another object of the present invention is to provide an efficient, economic recording, documentation and playback process with absolute accuracy.

A further object of the present invention is to provide not only playback of the subject matter of the recorded message, but the emotional modulation, as well.

A still further object of the present invention is to provide playback of the unique voice characteristics and audio timing of the speaker.

Still yet another object of the present invention is to provide a portable, highly mobile system for recording, documentation and playback of an audio message, the system having various options for power sources.

A still further objective of the present invention is to provide a system and method for transference of the recorded audio message to a computer system, computer device or the like for further action.

Further advantages of the invention will be brought out in the following portions of the specification, wherein the detailed description is for the purpose of fully disclosing preferred embodiments of the invention without placing limitations thereon.

MODES OF CARRYING OUT THE INVENTION

Figure 1:
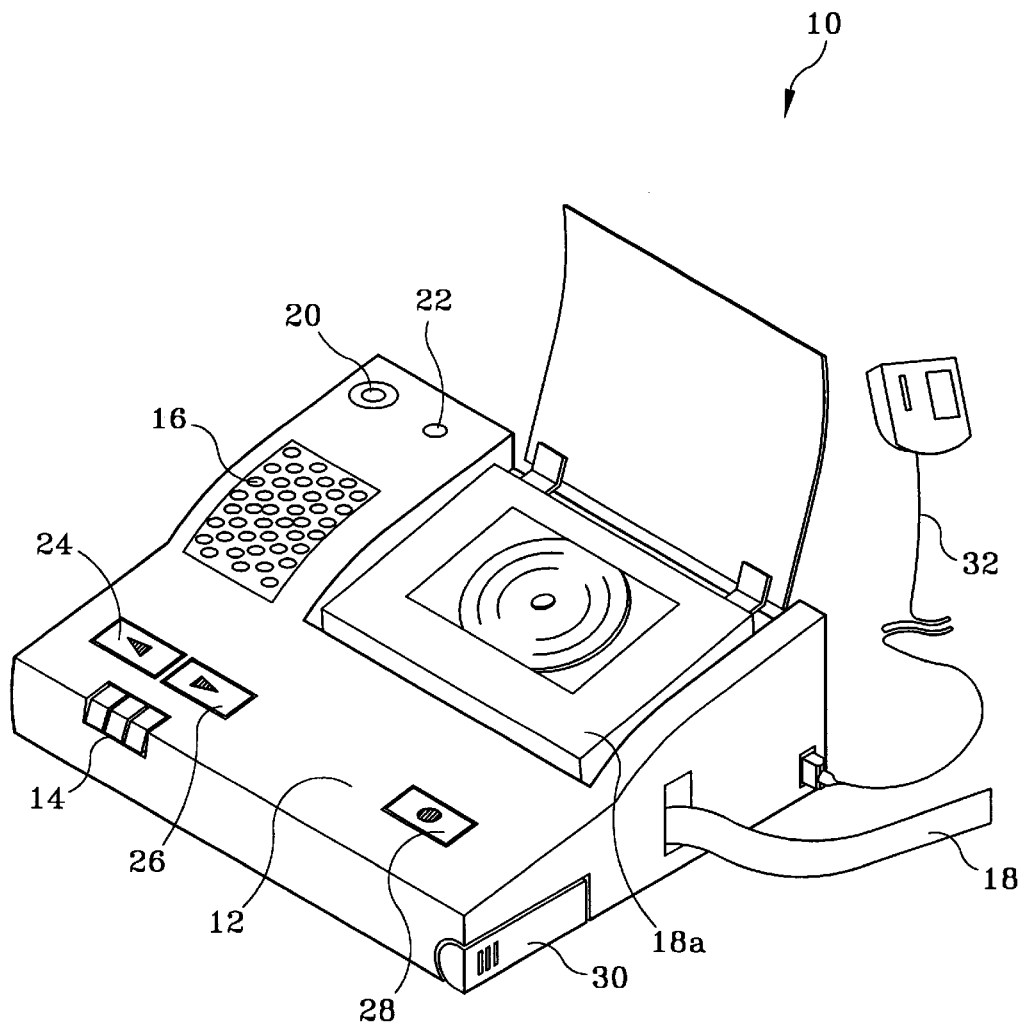
FIG. 1 illustrates a base unit according to the present invention.
Figure 2:
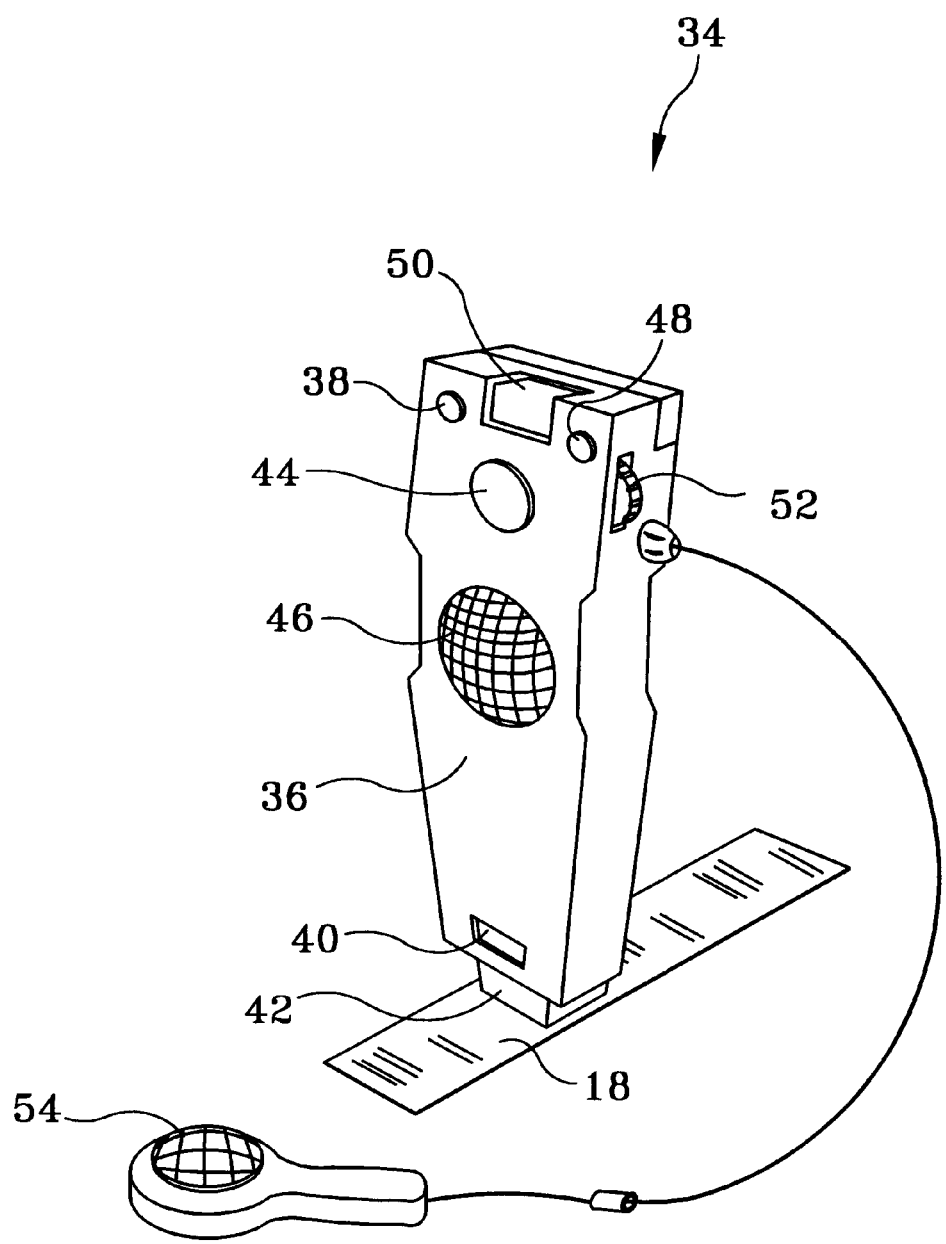
FIG. 2 illustrates a handheld unit according to the present invention.

Referring specifically to the drawings, wherein like references are made to the same items throughout, for illustrative purposes the present invention is generally embodied in the method and apparatus, including a base unit depicted in FIG. 1 and a handheld unit depicted in FIG. 2.

With reference to FIG. 1, an embodiment of the base unit shown generally at 10 includes housing 12, a microphone 14, a first speaker 16, a converter (not shown), an encoder (not shown), a memory component (not shown), and a record medium 18. The record medium 18 may be housed, for example, in a cartridge assembly 18a. Various embodiments of the system also include one or more of the following components: a first on/off selector 20; a power level indicator 22; a record selector 24; an audio test selector 26, a print selector 28, and a tape release selector 30. Various options for power sources are contemplated, including a power adapter 32 for use with a wall plug and/or batteries (not shown).

To use the base unit, the user selects the "on" setting for the first on/off selector 20 of the base unit 10, which triggers the power level indicator 22 to indicate the status of the power source. The user then actuates the record selector 28. Upon emittance of audio data, such as the human voice, within proper range, the microphone 14 receives the audio data and transfers it to the converter (not shown) that converts the audio analog signal to/from digital data. Upon conversion, the converter transfers the digital data to the memory component (not shown), where the data is temporarily stored. The user may then opt to perform an audio test on the recorded message, print out a record of the message, or both. To perform an audio test, the user simply actuates the audio test selector 26, whereafter the recorded message stored in the memory component is converted to analog data and played via the first speaker 16. This feature permits the user the opportunity to re-record the message before printing of the record medium, so the user is ensured capture of precisely the message intended for recordation. To print out the record medium 18 having a recorded message, the user actuates the print selector 28, whereafter the digital data is transferred to the record medium 18 in a format amenable to playback by the handheld unit. The user then selects the tape release selector 30, and the record medium 18 having the recorded message exits the base unit 10, ready for user-determined placement on a variety of objects.

Various embodiments provide a feature by which the system ensures replication of the timing aspects of the message; e.g., corrects jitter. Jitter is the deviation in or displacement of some aspect of the pulses in a high-frequency signal. As the name suggests, jitter can be thought of as shaky pulses. The deviation can be in terms of amplitude, phase timing, or the width of the signal pulse. Another definition is that it is "the period frequency displacement of the signal from its ideal location." Among the causes of jitter are electromagnetic interference (EMI) and crosstalk with other signals. Jitter can introduce clicks or other undesired effects in audio signals, and loss of transmitted data between network devices. The amount of allowable jitter depends greatly on the application. To ensure accurate replication of the timing aspects of the original message, the encoder produces a time sequence code according to the original captured message. The time sequence code can be incorporated into the data, recorded on the record medium adjacent to or embedded in the recorded message data, or in any manner that furthers the functionality described herein. In certain embodiments, the encoder is integrally associated with the converter, the memory device, or the like; e.g., a microchip.

The record medium 18 includes various embodiments conducive to the operations of the system and method herein described, including but not limited to media that facilitates magnetic, optical and/or digital recording and playback. The record medium 18 may be housed, for example, in the cartridge assembly 18a for ease of replacement or other mechanism conducive to efficient operation and mobility of the mechanism. In various embodiments, the record medium is integrally or otherwise associated with means for affixation; e.g., adhesive. The means for affixation may be disposed on a surface of the medium, a surface of a substrate associated with the medium, or otherwise affiliated with the medium to permit a user to affix the record medium to an object or surface of choice. It is further contemplated that various embodiments include means for affixation that are removably fixable to various objects, thus permitting a user to initially affix the record medium to a first object, remove at will, and reaffix to another object. Such an after use promotes efficient, intuitive storage of the recorded message on the record medium 18 with one or more objects in time as well as cost-effective use of the record medium 18. For example, an account manager can record client instructions from a recent meeting with a client onto the record medium 18, and affix the record medium to a purchase order 18. Upon processing of the purchase order 18, the orders department can remove the record medium 18 having the recorded client instructions, and reaffix the record medium 18 to the supply document for further downstream processing in various departments.

Turning now to FIG. 2, there is shown generally at 34 a handheld unit having a body 36, a second on/off selector 38, a data collect selector 40, a data pickup head 42, a memory device (not shown), a deconverter (not shown), a playback selector 44, a second speaker 46, a data send selector 48, and a data sender 50. Various embodiments of the handheld unit further include a decoder (not shown), a volume control 52, and an earplug mechanism 54.

After recordation of a message onto the record medium 18, the user powers on the handheld unit 34 via the second on/off selector 38, and actuates the scan function by selecting the data collect selector 40. The user then passes the data pickup head 42 in close proximity to the record medium 18, whereby the data pickup head 42 picks up the data encoded thereon, and transfers the data to a memory device (not shown) such as a microchip or other for storage of the data. Once the recorded message has been scanned, the user may immediately or at a later time select the playback selector 44, whereafter the digital data is transferred to the deconverter (not shown) for conversion from/to a digital/analog signal and amplification via the second speaker 46 for playback of the original message in true quality form for the user. For example, a first user may record a sentimental message for her grandchildren, and attach the message to a treasured heirloom. The grandchildren may later scan the message on the record medium for playback, and are thus able to hear grandmother's familiar, loving voice as well as the message pertaining to the heirloom.

In various embodiments of the present system, a decoder processes the encoded time sequence, supra, for playback of the message according to its original timing. One skilled in the art will appreciate that the decoder may be integrally or independently associated with the deconverter and/or memory device; e.g., a microchip. Various accoutrements, such as the earplug mechanism 54 for direct, private listening of the message, and a clip-on holster (not shown) for ease of transport, enhance the user-friendly aspects of this system.

Figure 3:
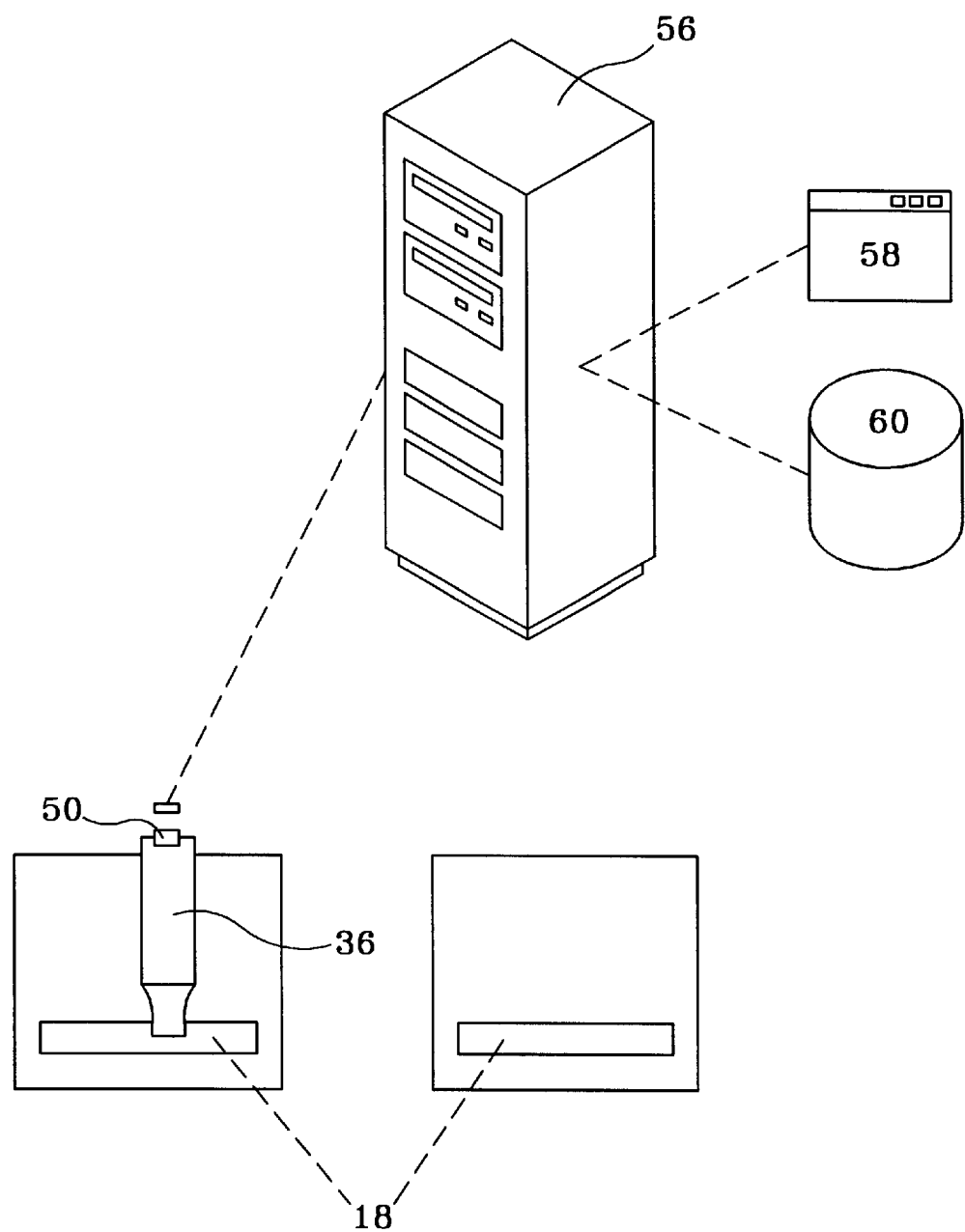
FIG. 3 illustrates a schematic representation of the data send function associated with the present invention.

Turning now to FIG. 3, there is shown a schematic representation of the data send function associated with the present invention, whereby recorded data may be stored and forwarded to a computer system or computer device for further processing, storage, manipulation, or the like. To accomplish this, recorded data stored in the memory device (not shown) is transferred to the data sender 50 and transmitted to a device capable of reception. A skilled artisan will recognize that various components and methods may be implemented to carry this out, including but not limited to infrared transmitters, short wave radio transmitters, optical transmitters, and other means for transfer of data communications. For example, record media 18 having recorded messages pertinent to client contact information and affixed to business documentation may be scanned with the handheld unit 36, whereafter the user actuates the data sender 50. The data sender 50 transmits the scanned data to a computer system shown generally at 56. Software 58 converts the data to a format compatible with storage in a client address database 60.

Figure 4:
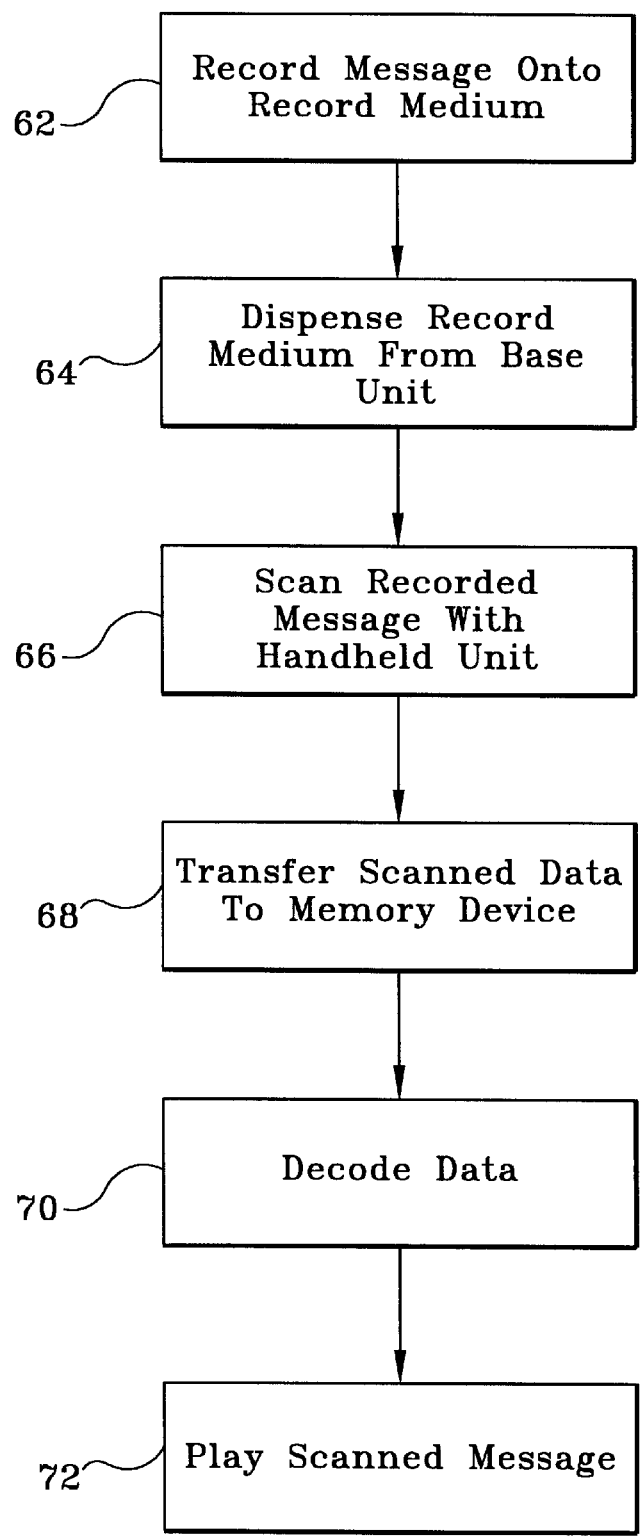
FIG. 4 illustrates a process for recording and playing messages according to the present invention.

With respect to FIG. 4, there is shown a process of the present invention, including the steps of recording, via a base unit having a housing, a microphone, a converter, a memory component, an encoder, a first speaker, an audio message onto a record medium having means for affixation, the record medium associated with the base unit at 62;

dispensing from the base unit the record medium having a recorded message at 64; scanning the recorded message on the record medium with a handheld unit having a body, a data pickup head, a memory device, a deconverter, a data sender, a decoder, and a second speaker at 66; transferring the scanned data to a memory device at 68; decoding the data at 70 and playing the scanned message with the handheld unit at 72. In various embodiments, included are one or more of the steps of transmitting the stored message to another device via a data sender; converting the digital data to analog format; converting the analog data to digit format; encoding a time sequence; and decoding an encoded time sequence;.

Various electrical, digital and/or mechanical components necessary to carry out the function of the system or method described herein are also contemplated. Although the description above contains much specificity, this should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention encompasses other embodiments which may become obvious to skilled artisans, and that the scope of the present invention is accordingly to be limited by nothing other than the appended claims, in which reference to an element in the singular is not intended to mean "one and only one" unless explicitly so stated, but rather "one or more". All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claim. No claim element herein is to be construed under the provisions of 35 U.S.C. 112, sixth paragraph, unless the element is expressly recited using the phrase "means for".

INDUSTRIAL APPLICABILITY

The present invention provides a system and method for ready recordation in real time of an audio message, whereby the system captures with absolute accuracy the audio and emotional modulation of the original message, converts the recorded message to a digital format, and stores the message on a record medium integrally associated with the system. The system and method further provide the record medium with recorded message to the user such that the user can removably affix the record medium to a wide range of objects. The system and method easily facilitate read, decode, and playback functionality for the recorded message without necessitating removal of the record medium from the object to which it is affixed. Further, such device and medium promote playback of an audio message in a format that retains the modulation qualities, timing sequence and characteristics of the original audio message. The system and method is compact and mobile for ease of use, with accommodations for multiple power sources. Additionally, the present invention provides the capability to store and forward audio messages in digital format, for use with computer systems and computer-related devices. In light of the foregoing it is contemplated that the present invention will prove highly marketable to consumers in various venues, particularly those who seek the technical functionality and features provided in the invention.

What is claimed is:

1. A system for recording and playback of audio data, the system comprising:
   a base unit comprising:
      a microphone adapted to receive audio data;
      a memory component adapted to store the audio data; and
      a first speaker adapted to play the audio data;
   a record medium, comprising a variable length tape adapted to receive the audio data from the base unit, wherein the record medium further comprises at least one medium selected from a set consisting of an electrical medium and a magnetic medium; and
   a handheld unit comprising:
      a pickup head adapted to read the audio data from the record medium; and
      a second speaker adapted to play the audio data.

2. The system of claim 1, wherein the record medium comprises a tape, and further comprises at least one member selected from the group essentially consisting of a magnetic tape, a tape accommodating digital data, and a microchip associated with a tape.

3. The system of claim 1, further comprising means for affixing the record medium to an object, the affixing means associated with the record medium.

4. The system of claim 1, wherein the handheld unit further comprises:
   a memory device adapted to store the audio data; and
   a data sender adapted to transmit the audio data.

5. The system of claim 4, wherein the data sender further comprises at least one member selected from the group essentially consisting of optical data sender and infrared sender.

6. The system of claim 4, wherein the handheld unit further comprises at least one member selected from the group essentially consisting of a decoder; a data send selector; volume control; ear plug mechanism; data collect selector; play selector and a second on/off selector.

7. The system of claim 1 wherein the record medium is adapted to reside on a surface.

8. The system of claim 1 wherein the base unit includes an encoder adapted for capture of a timing sequence associated with the rate of speech originally recorded.

9. A system for recording and play back of an audio message, the system comprising:
   a base unit having a housing, a microphone, a converter, a memory component, a first speaker, a record medium, and an encoder;
   a recording medium comprising variable length tape having means for removably affixing to objects, the tape mechanically associated with the base unit, wherein the record medium comprises at least one medium further selected from a set consisting of an electrical medium and a magnetic medium;
   a handheld unit having a body, a data pickup head, a memory device, a deconverter, a data sender, a decoder and a speaker; and
   at least one power source component.

10. The system of claim 3, wherein the record medium further comprises at least one member selected from the group essentially consisting of a magnetic tape, a tape accommodating digital data, and a microchip associated with a tape.

11. The system of claim 3, wherein the data sender further comprises at least one member selected from the group essentially consisting of optical data sender and infrared sender.

12. The system of claim 3, wherein the handheld unit further comprises at least one member selected from the group essentially consisting of a data send selector; volume control; ear plug mechanism; data collect selector; play selector and a second on/off selector.

13. The system of claim 3, wherein the power source component further comprises at least one power source component selected from the group essentially consisting of an AC adapter and a battery.

14. The system of claim 9 wherein the recording medium is adapted to reside on a surface.

15. A method for recording and playing an audio message, the method comprising the steps of:

recording a recorded message, via a base unit having housing, a microphone, a memory component, a first speaker, and a converter, onto a variable length tape record medium having means for affixation, the record associated with the base unit medium comprises at least one medium further selected from a set consisting of an electrical medium and a magnetic medium;

dispensing from the base unit the record medium having the recorded message;

scanning the recorded message on the record medium with a handheld unit having the a body, a data pickup head, a memory device, a deconverter, a data sender, a decoder and a second speaker;

storing the scanned data in the memory device; and playing the scanned message with the handheld unit.

16. The method of claim 15, further comprising the step of transmitting the stored data to another device via the data sender.

17. The method of claim 15, further comprising at least one of the following steps:

converting the data to a digital format;

converting the data to an analog format;

encoding a time sequence; and decoding an encoded time sequence.

* * * * *

UNITED STATES PATENT AND TRADEMARK OFFICE
CERTIFICATE OF CORRECTION

PATENT NO. : 6,577,458 B2
DATED : June 10, 2003
INVENTOR(S) : Richard Paul Day

It is certified that error appears in the above-identified patent and that said Letters Patent is hereby corrected as shown below:

<u>Column 8,</u>
Line 62, delete "The system of claim 3" and replace with -- The system of claim 9 --;

<u>Column 9,</u>
Line 1, delete "The system of claim 3" and replace with -- The system of claim 9 --;
Line 5, delete "The system of claim 3" and replace with -- The system of claim 9 --;
Line 10, delete "The system of claim 3" and replace with -- The system of claim 9 --.

Signed and Sealed this

Sixteenth Day of September, 2003

JAMES E. ROGAN
*Director of the United States Patent and Trademark Office*